(12) United States Patent
Winkler

(10) Patent No.: US 8,555,398 B2
(45) Date of Patent: Oct. 8, 2013

(54) ROLE-BASED ACCESS TO SHARED RFID DATA

(75) Inventor: Steve Winkler, San Francisco, CA (US)

(73) Assignee: SAP AG, Walldorf (DE)

( * ) Notice: Subject to any disclaimer, the term of this patent is extended or adjusted under 35 U.S.C. 154(b) by 1514 days.

(21) Appl. No.: 11/647,357

(22) Filed: Dec. 29, 2006

(65) Prior Publication Data

US 2008/0157933 A1   Jul. 3, 2008

(51) Int. Cl.
*H04L 29/06* (2006.01)

(52) U.S. Cl.
USPC .......... 726/26; 726/1; 726/20; 340/10.6; 340/572.1

(58) Field of Classification Search
USPC .............. 726/26; 340/10.6; 705/22
See application file for complete search history.

(56) References Cited

U.S. PATENT DOCUMENTS

| | | | |
|---|---|---|---|
| 5,577,252 A | 11/1996 | Nelson et al. | |
| 7,076,541 B1 | 7/2006 | Burstein et al. | |
| 7,089,325 B1 | 8/2006 | Murtza et al. | |
| 7,765,253 B1 | 7/2010 | Sarma et al. | |
| 2003/0158857 A1 | 8/2003 | Weng et al. | |
| 2004/0006704 A1 | 1/2004 | Dahlstrom et al. | |
| 2004/0254842 A1* | 12/2004 | Kirkegaard | 705/22 |
| 2006/0012805 A1 | 1/2006 | Liu | |
| 2006/0218149 A1 | 9/2006 | Patrick | |
| 2006/0235795 A1 | 10/2006 | Johnson et al. | |
| 2006/0259977 A1* | 11/2006 | Patrick | 726/26 |
| 2006/0277220 A1* | 12/2006 | Patrick et al. | 707/200 |
| 2006/0293968 A1 | 12/2006 | Brice et al. | |
| 2007/0027734 A1 | 2/2007 | Hughes | |
| 2007/0060114 A1 | 3/2007 | Ramer et al. | |
| 2007/0109100 A1* | 5/2007 | Jett et al. | 340/10.4 |
| 2007/0118892 A1 | 5/2007 | Sastry et al. | |
| 2007/0299804 A1 | 12/2007 | Liu et al. | |
| 2008/0005076 A1 | 1/2008 | Payne et al. | |
| 2008/0040674 A1 | 2/2008 | Gupta | |
| 2008/0098099 A1 | 4/2008 | Khasnis et al. | |
| 2008/0109411 A1 | 5/2008 | Young et al. | |
| 2008/0157930 A1 | 7/2008 | Winkler et al. | |
| 2008/0157931 A1 | 7/2008 | Winkler | |
| 2008/0157932 A1 | 7/2008 | Winkler | |
| 2008/0224823 A1 | 9/2008 | Lawson et al. | |
| 2009/0222541 A1 | 9/2009 | Monga et al. | |

OTHER PUBLICATIONS

Shui et al; "Application of XML Schema and Active Rules System in Management and Integration of Heterogeneous Biological Data"; Proceedings for third IEEE 2003, IEEE. Mar. 2003, pp. 367-374.*

Office Action issued in co-pending U.S. Appl. No. 11/647,143, mailed Dec. 23, 2009 (9 pages).

Office Action issued on Jun. 3, 2010 in co-pending U.S. Appl. No. 11/647,143 (13 pages).

(Continued)

*Primary Examiner* — Taghi Arani
*Assistant Examiner* — Jason Lee
(74) *Attorney, Agent, or Firm* — Finnegan, Henderson, Farabow, Garrett & Dunner, LLP

(57) ABSTRACT

An electronic product code information service (EPCIS) interface is provided, where the EPCIS interface is capable of allowing one or more accessing applications residing on a variety of systems and associated with a plurality of enterprises/organizations to receive EPC-related data. One or more roles of an entity attempting to receive EPC-related data through the interface may be identified. A query may be performed to generate a result set within an extent permitted by access authorization associated with the identified roles of the entity.

9 Claims, 8 Drawing Sheets

(56) References Cited

OTHER PUBLICATIONS

Office Action issued on Jun. 3, 2010 in co-pending U.S. Appl. No. 11/647,193 (26 pages).
Office Action issued on Apr. 28, 2010 in co-pending U.S. Appl. No. 11/647,194 (9 pages).
Final Office Action issued on Nov. 19, 2010, in co-pending U.S. Appl. No. 11/647,193 (32 pages).
Final Office Action issued on Oct. 14, 2010, in co-pending U.S. Appl. No. 11/647,194 (11 pages).
Advisory Action issued on Dec. 30, 2010, in co-pending U.S. Appl. No. 11/647,194 (3 pages).
Advisory Action issued on Jan. 26, 2011, in co-pending U.S. Appl. No. 11/647,193 (4 pages).
Advisory Action, U.S. Appl. No. 11/647,194, mailed Jan. 4, 2012 (3 pages).
Examiner's Answer, U.S. Appl. No. 11/647,194, mailed Aug. 29, 2012 (11 pages).
Final Office Action, U.S. Appl. No. 11/647,143, mailed Apr. 17, 2012 (15 pages).
Final Office Action, U.S. Appl. No. 11/647,194, mailed Sep. 14, 2011 (10 pages).
Office Action, U.S. Appl. No. 11/647,143, mailed Jul. 15, 2011 (13 pages).
Office Action, U.S. Appl. No. 11/647,143, mailed Jan. 5, 2012 (13 pages).
Office Action, U.S. Appl. No. 11/647,143, mailed Sep. 13, 2012 (17 pages).
Office Action, U.S. Appl. No, 11/647,193, mailed Aug. 17, 2012 (30 pages).
Office Action, U.S. Appl. No. 11/647,194, mailed May 9, 2011 (8 pages).
Notice of Allowance, U.S. Appl. No. 11/647,193, mailed Feb. 25, 2013 (15 pages).
Office Action, U.S. Appl. No. 11/647,143, mailed Mar. 7, 2013 (14 pages).

* cited by examiner

ROLE-BASED ACCESS TO SHARED RFID DATA

TECHNICAL FIELD

The field of the invention relates in general to radio frequency identification (RFID). More particularly, the field of the invention relates to role-based access to sensor-related data such as Electronic Product Code (EPC) data and/or RFID data that is shared across enterprises/organizations.

BACKGROUND

Radio frequency identification (RFID) technology is being used at an expanding rate by manufacturers, retailer, logistics providers, and other users to replace or supplement a variety of traditional systems. Most notably, RFID technology may be implemented as a part of a supply chain management system to facilitate tracking, securing, and managing of items from manufacturing to retail.

In essence, RFID works by enabling a wireless exchange of information between a tagged object and a reader/writer, which in turn allows a host to process the information associated with the tagged object. FIG. 1 shows one example of such an RFID system. Three components are included in this basic RFID system 100. First, one or more tags 102 or transponders may be deposited on an item to be tracked. The item may be any suitable item known to those skilled in the art upon which an RFID tag may be attached, such as retail merchandise. The tags 102 may vary in shapes, sizes, and materials to suit the conditions of the item. Each RFID tag 102 may include two components, a computer chip 106 and an antenna 108. Appropriate information associated with the tagged item, including, for example, item name, description, or any other suitable item-related information, may be stored on the computer chip 106 and/or a server away from the tag.

Depending on the application, the tags 102 may be passive, active, or battery assisted. Passive tags generally utilize the power derived from the signals sent by a reader to respond to the reader. Active tags power their transmissions with an attached battery, while battery-assisted tags use an attached battery to power chip electronics, but does not use the battery for transmission. While the less costly passive tags are most frequently used in connection with supply chain management systems, active tags play a major role in marking shipping containers etc. in the supply chain management systems.

Functionally, tags 102 may fall into two categories, read-only or read/write. Read-only tags are programmed with a fixed set of information during manufacturing, and this information cannot be altered at a later time. Read/write tags on the other hand allow writing and/or rewriting of its information by an authorized user. Some read/write tags may include a read-only portion in which certain information may be stored and protected while allowing other information stored in a writable portion to be modified. Some examples for modifying the read/write tags, for example, to effect tracking of a product from manufacturing to retail, will be discussed in more detail below.

One or more read/write devices or interrogators 110 may be used to communicate with the tags 102. The read/write device 110 may include an antenna 112, a transceiver 114, and any other suitable components for facilitating reading and writing to tags 102. Typically, to communicate with a particular tag or set of tags 102, the read/write device 110 sends out through transceiver 114 and antenna 112 an RF signal in the frequency to which the target tags 102 are tuned. In response to receiving the signal, the targeted tags 102 respond by transmitting at least a part of their stored data. Upon receiving the data transmitted by the tags 102, the reader/writer 110 decodes the data and may transfer the data to a host computer system 116 for processing. The reader/writer 110 may either be fix-positioned or portable and may be either wired or wireless.

An RFID tag often contains data in the form of an Electronic Product Code (EPC). The EPC is essentially a unique serial number that is assigned to the item to which the RFID tag is affixed or otherwise associated. The tag may also contain EPC-related information, i.e., any suitable information that has been associated with the item bearing an EPC.

An RFID system provides many advantages over traditional tracking and inventory systems that utilize code-based technologies (e.g., bar code). Most notably, RFID utilizes radio frequency for communication and therefore may communicate with multiple tags positioned out of sight. In addition, much more information may be stored on an RFID tag, which provides a broad range of opportunities for associating various information with the tracked items. The read/write tags have the added advantage of reusability and modifiability, which reduces replacement cost and allows more accurate and flexible association of information with the tracked items.

In view of the above advantages associated with RFID technology, many enterprises/organizations have developed applications for implementing RFID in their various operations. For example, RFID tags may be attached to individual products as they come off the production line at a manufacturer's factory. These tags may contain data such as the date of production, special product care instructions (i.e., a special temperature that the product is to be kept at), and/or any other suitable information that the manufacturer wishes to have associated with the product. The manufacturer may store the tag information in its own database. Scanning of the tags as the products leave the factory, for example, via a tag reader fixed to a door, may inform the manufacturer which products are no longer stored in the factory. This information may be used to update the manufacturer's database, which may in turn allow the manufacturer to monitor, manage, and/or optimize its business, for example, by using the data to assess whether it has been consistently shipping out the oldest products in accordance with its first-in-first-out (FIFO) policy.

This example illustrates one scenario in which RFID data collection, storage, and analysis may be helpful to a manufacturer, for example, for streamlining its operations. Many other scenarios exist where RFID data may be used to optimize, manage, and otherwise benefit an enterprise/organization. Additionally, because today's businesses are interconnected with each other in a plethora of ways, it is quite probable that one enterprise/organization's RFID data may also be very beneficial to other enterprises/organizations such as enterprises/organizations situated down the supply chain from the manufacturer.

In one particular scenario, an enterprise/organization, acting in the role of a retailer that purchases from the above manufacturer, may wish to gain access to the manufacturer's stored RFID data, including production date and shipped date data. Using this data, the retailer may determine the best time to schedule its quarterly shipment from the manufacturer to ensure that the manufacturer will have enough products on hand to satisfy the retailer's needs.

In another scenario, the enterprise/organization, in its retailer role, may wish to gain access to the manufacturer's stored RFID data, for example, with regard to the special condition that the products have been kept under (i.e., temperature for perishable food). Using this data, the retailer may determine whether an expiration date can be properly applied because the products have been kept according to the manufacturer's special instructions.

On the reverse side, the enterprise/organization in the manufacturer role may wish to analyze the retailer's RFID data, for example, generated from sales made at the cash register, to infer how many products have been sold within a particular period. The manufacturer may use this data to adjust its production schedule to promptly satisfy reorder demands from the retailer.

These examples demonstrate, at a high level, some benefits of RFID data access both within and across enterprises/organizations in their various related roles. Many other scenarios exist in which data sharing among a plurality of users acting in a variety of roles within an enterprise/organization and across multiple enterprises/organizations could be advantageous for everyone involved.

Many enterprises/organizations have realized the power of such data sharing, but few have made it a reality due to the obstacles associated with such sharing. A primary obstacle is an enterprise/organization's concern over proper authorization of an enterprise/organization and/or a particular user within an enterprise/organization that accesses the data. For example, the enterprise/organization acting in a retailer role in the above examples may wish the enterprise/organization acting in a related manufacturer role to see how many of the manufacturer's products are left in the retailer's warehouse to enable the manufacturer to restock automatically. At the same time, the retailer may not wish the manufacturer to gain access to information about what other products are being stored in the retailer's warehouse or sold at its registers. Additionally, the retailer may be concerned with which individuals and/or sub-organizations within the manufacturer's organization are accessing the retailer's data. For example, the retailer may only wish to share its data with a user acting in a product management role (e.g., manufacturer's production manager) to see the relevant product information and would like to prevent individuals outside of that role (e.g., warehouse workers) from accessing the same information.

One way to address the above need of the retailer may be to require that the retailer modify its database to prevent the enterprise/organization acting in the manufacturer role from seeing some subsets of data. The retailer could further restrict the data view scope of specific individuals and/or sub-organizations acting in specific roles within the manufacturer's organization. This approach may work if the sharing is only on a small scale between a limited number of enterprises/organizations, each having a small number of sub-organizations and/or individuals with data access capabilities. The approach is less desirable, however, if the number of organizations, individuals, and/or sub-organizations sharing the data are large or the databases themselves are vast because each sharer must be painstakingly assessed, prevented, or allowed to view specific data sets.

Another obstacle for sharing RFID data across enterprises/organizations is that data warehousing and data mining are performed very differently from one enterprise/organization to another. It is not uncommon for two enterprises/organizations to differ in everything from the type of databases to the type of hardware to the type of network connections they use. Since different hardware and software rarely work together in a cohesive and smooth manner without considerable integration work, RFID data sharing can be difficult from a technical standpoint.

In view of the above, a need exists for an improved way of providing a sensor-related data (e.g., EPC/RFID data) sharing scheme so that enterprises/organizations and their associated individuals and sub-organizations participating in the data sharing scheme may gain access to sensor-related data collected and stored by other enterprises/organizations in a seamless fashion. An additional need exists for the data sharing scheme to provide a way to identify roles of individuals, sub-organizations, and enterprise/organizations in relation to each other and provide the appropriate level of access authorization to data based on the identified roles. A further need exists for the data sharing scheme to maintain a set of consistent sharing rules that may be adopted by each of the participating enterprise/organization to suit its particular sharing needs without having to make specific adjustments with regard to each individual, sub-organization, and/or enterprise/organization that it wishes to share data with.

SUMMARY

Consistent with the principles of the present invention, a method and system is provided for allowing a plurality of enterprises/organizations and their associated individuals and/or sub-organizations to share sensor-related data using a common standard interface while at the same time limiting the data shared based on the roles of the enterprises/organizations and their associated individuals and/or sub-organizations in relation to the enterprise/organization from which the sensor-related data is being requested. It will be understood that while EPC-related data is used throughout the application as the specific example of sensor-related data, any other sensor-related data may be suitable within the spirit of the present invention.

This role-based access approach reduces the complexity and cost of user management. Rather than managing the access authorization of each individual, sub-organization, or enterprise/organization, appropriate access authorization may be defined in association with roles. Each individual, sub-organization, or enterprise/organization may authenticate into one or more roles in relation to the enterprise/organization from which EPC-related data is being requested and the access authorization that has been defined in association with that role may then be used to provide the appropriate level of data access to the individual, sub-organization, or enterprise/organization with regard to the shared EPC-related data.

In some embodiments, a standard data sharing service such as an electronic product code information service (EPCIS) interface is provided. It will be understood that while EPCIS is given as the specific example of a data sharing service, any other suitable data sharing service may be used without departing from the spirit of the present invention. The EPCIS interface may be capable of allowing one or more accessing applications residing on a variety of systems and associated with a plurality of enterprises/organizations to receive EPC-related data.

One or more roles of an entity attempting to receive EPC-related data, for example, generated by a query through the EPCIS interface using an EPCIS accessing application, may be identified. The entity may be, for example, an enterprise/organization or an individual or sub-organization associated with the enterprise/organization. The one or more roles may be standardized roles that are commonly recognized across enterprises/organizations. In some embodiments, the roles associated with the individuals and/or sub-organizations within an enterprise/organization may simply refer to levels of access authorization and not to specific user roles.

Once the entity has been identified with one or more roles, the query may be performed to generate a result set within an extent permitted by access authorization associated with the identified roles of the entity. In some embodiments, each enterprise/organization may assign their own access authorizations to commonly defined roles to ensure data access to the enterprise/organization's data is consistent with its policies. In some embodiments, access authorizations may be commonly defined across enterprises/organizations that wish to share EPC-related data.

To ensure that an accessing entity only receiving data that is authorized for access by the entity in its identified roles, the query may be performed in such a way that the result set generated based on the query may be restricted by, for example, redacting EPCIS data that is not authorized for access by an entity, making the query result more high level and less detailed than the result that would have been presented if no authorization restrictions were in place, removing a part of the unrestricted result, or any other suitable restriction methods. The reduced result set is then provided to the EPCIS accessing application used by the entity.

Further features and embodiments of the present invention will become apparent from the description and the accompanying drawings. It will be understood that the features mentioned above and those described hereinafter may be used not only in the combination specified but also in other combinations or on their own, without departing from the scope of the present invention. It will also be understood that the foregoing background, summary, and the following description of the systems consistent with the principles of the present invention are in no way limiting on the scope of the present invention and are merely illustrations of a preferred embodiment of the present invention.

BRIEF DESCRIPTION OF THE DRAWINGS

Referring now to the drawings, in which like numerals represent like elements throughout the several Figures, aspects of the present invention and the exemplary operating environment will be described.

DETAILED DESCRIPTION

Figure 1:
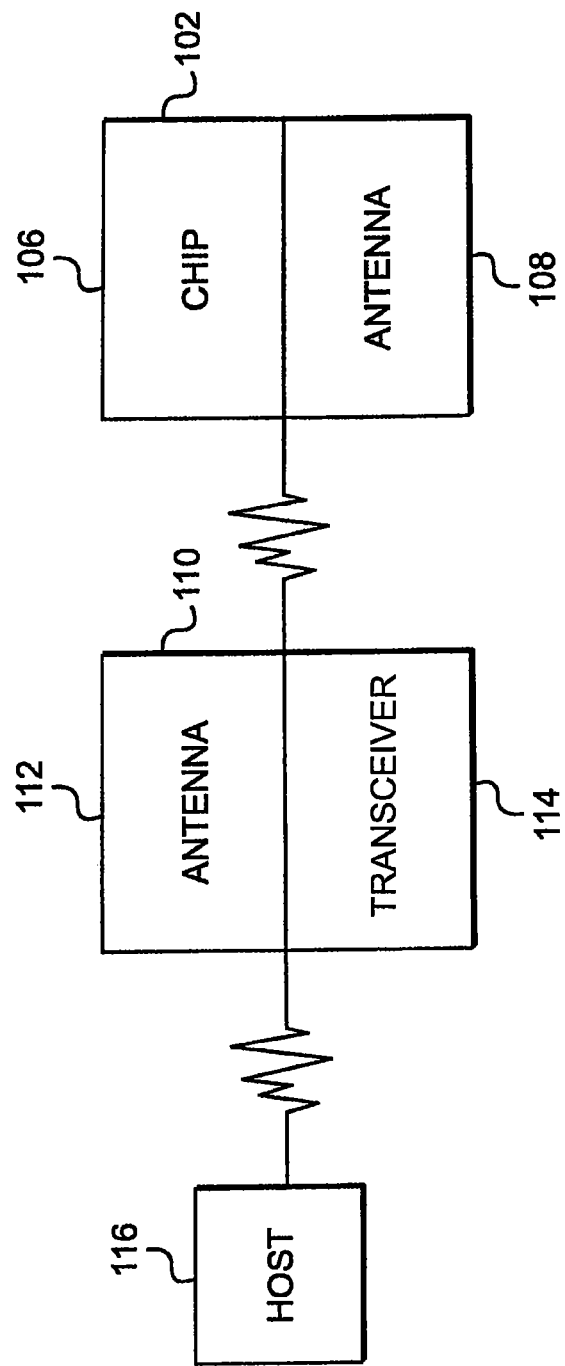
FIG. 1 is a block diagram of an illustrative RFID system for facilitating reading and writing to a read/write RFID tag.

The following detailed description refers to the accompanying drawings. Wherever possible, the same reference numbers are used in the drawings and the following description to refer to the same or similar parts. While several exemplary versions and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding stages to the disclosed methods. Accordingly, the following detailed description does not limit the invention. Instead, the proper scope of the invention is defined by the appended claims.

Consistent with the principles of the present invention, a method and system is provided in connection with an Electronic Product Code Information Service (EPCIS) or another suitable service to enable participating enterprises/organizations and its associated sub-organizations and/or individuals to share Electronic Product Code-related data (e.g., obtained from RFID tags) through a role-based access scheme. It will be understood that while EPCIS is provided as specific example, any other suitable service based on any other suitable standard may be implemented without departing from the spirit of the present invention.

At a high level, the Electronic Product Code Information Service (EPCIS) specifies a standard interface for accessing EPC-related information. EPC-related information may be any suitable information that has been associated with an object bearing an Electronic Product Code (EPC), which usually involves a unique serial number that is assigned to the object via an RFID tag.

Typically, EPC-related data falls into two broad categories. One category involves timestamped event data that is collected throughout the lifecycle of an object. This type of event data may include, for example, observation data associated with tag readings (e.g., time data associated with scanning of the RFID tag of a product at a retail register), measurement data (such as sensor readings, temperature history, etc.), location history, business transaction history, and any other timestamped event data. Another category of EPC-related data involves attribute data that is, for example, a fixed part of the RFID tag and is not continuously updated. This type of data may include, for example, manufacturing date, expiration date, and any other data that is specific to the product with which the EPC is associated and does not require continuous updating.

Unlike other networks that are concerned with synchronization of data about products (i.e., the GDSN, UCCNet, etc.), EPCIS is primarily focused on sharing of serial-level EPC-related data via a much more distributed architecture. What EPCIS provides is a technical specification for a data communication interface in a model that allows different applications to leverage EPC-related data both within and across enterprises/organizations. In particular, the EPCIS enables the capturing and querying of EPC-related data using a defined set of service operations and associated EPC-related data standards, all combined with appropriate security mechanisms that satisfy the needs of user enterprises/organizations. In other words, the EPCIS places no restrictions on the different enterprises/organizations' underlying database, underlying operating system, underlying programming language, or underlying information system integration.

With regard to the standard interface for accessing the EPC-related data, EPCIS supports both on-demand polling access and a "push" model, which deals with standing queries. Depending on how the security for each individual EPCIS implementation is configured by, for example, an enterprise/organization that owns the particular EPCIS, rights may be granted for a user enterprise/organization of the EPCIS to define its own standing queries or the user enterprise/organization may only have the option of subscribing to an existing query, which, for example, has been pre-defined by the enterprise/organization provider of that particular EPCIS service. In many or most cases, one or more databases of EPC-related data is involved, though elements of the EPCIS could be used for direct application-to-application sharing without persistent databases.

Figure 2:
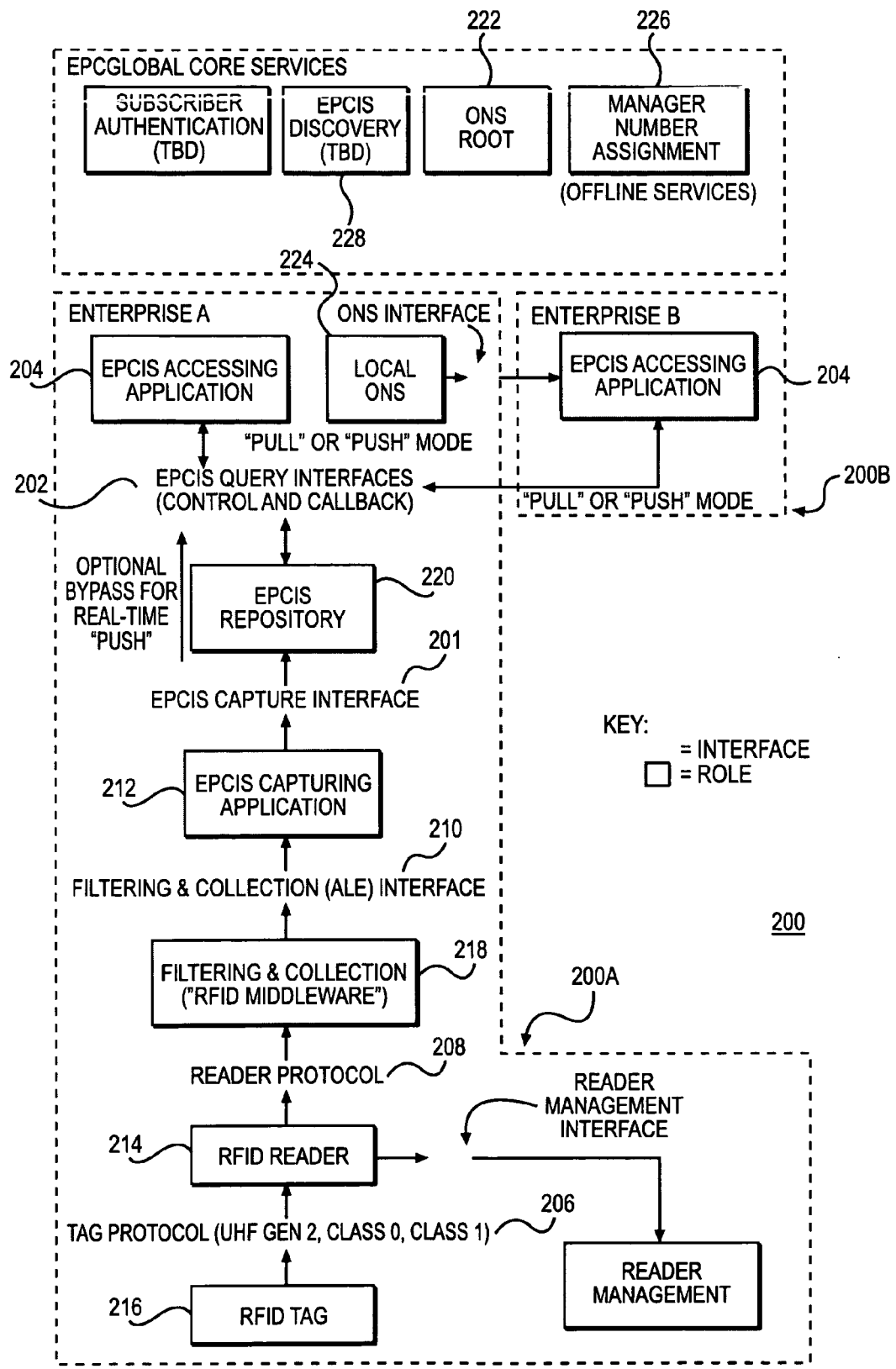
FIG. 2 is a schematic block diagram illustrating the relationships within an EPCglobal Architecture Framework.

FIG. 2 is a schematic block diagram illustrating the relationships within an EPCglobal Architecture Framework 200. EPCglobal generally refers to an organization set up to achieve world-wide adoption and standardization of Electronic Product Code (EPC) technology. The main focus of the EPCglobal Architecture Framework 200 is to create both a world-wide standard for RFID and sharing of EPC-related data via the EPCglobal Network.

In FIG. 2, boxes denote roles played by hardware and/or software components of the system while the bars that have shadows denote interfaces governed by the various standards of EPCglobal, including the EPCIS. EPCglobal Architecture Framework 200 is divided between hardware and software components in Enterprise A, labeled 200A in FIG. 2, and Enterprise B (200B).

The flow of data from an RFID tag 216 in Enterprise A is depicted from the bottom to the top of 200A in FIG. 2. At the base bevel, RFID reader 214 makes one or more observations of RFID tag 216 when RFID tag 216 comes within the read zone of RFID reader 214, for example, when a product bearing RFID tag 216 passes through a warehouse door where RFID reader 214 is mounted. These raw EPC observations are governed by Tag Protocol 206. The raw tag observations made by RFID reader 214 are then delivered in accordance with the definition provided by Reader "Wireline" Protocol Interface 208 to Filtering & Collection 218, which is often referred to as the RFID middleware. The time interval for the collection of the raw tag observations by Filtering & Collection 218 may be determined by, for example, events defined by EPCIS Capturing Application 212. A suitable event may be, for example, the tripping of a motion detector on a product line.

The delivery of the filtered and collected tag read data from Filtering & Collection 218 to EPCIS Capturing Application 212 may be performed according to the control and definition specified by Filtering & Collection Interface 210. EPCIS Capturing Application 212 may supervise the operation of the lower-level architectural elements, for example, by providing filtering criteria to Filtering & Collection 218, and may provide business context by coordinating with other sources of information involved in executing a particular step of a business process. In essence, EPCIS Capturing Application 212 understands the business process steps during which data capture takes place and provides intelligent guidance with regard to what actions to take in connection with the data capture. For example, EPCIS Capturing Application 212, while coordinating a conveyor system with filtering and collection events, may check for exceptional conditions and take corrective action such as diverting a bad batch of products into a rework area.

Above EPCIS Capturing Application 212, at the top portion of EPCglobal Architecture Framework 200 resides the EPCIS Interfaces. These EPCIS Interfaces may include EPCIS Capture Interface 201 and EPCIS Query Interface. The EPCIS Interfaces provide EPC-related data to enterprise/organization-level roles such as EPCIS Repository 220 and EPCIS Accessing Application 204 both inside an enterprise/organization and outside of it, for example, at another enterprise/organization.

The EPCIS interfaces may include three specific interfaces: EPCIS Capture Interface 201, EPCIS Query Interfaces 202, and EPCIS Query Callback Interface, which is shown as a part of Interface 202 in FIG. 2. EPCIS Capture Interface 201 may define the delivery of EPCIS events from EPCIS Capturing Applications 212 to other roles that utilize the event data in real time, including EPCIS Repository 220. EPCIS Repository 220 may in turn store events generated by one or more EPCIS Capturing Applications, and may make these events available for later query, for example, by EPCIS Accessing Applications 204. EPCIS Capture Interface 201 may also "push" data in real time to EPCIS Accessing Applications 204.

EPCIS Query Control Interface 202, on the other hand, defines a means for EPCIS Accessing Application both inside and outside of the enterprise/organization to obtain EPCIS data subsequent to capture, for example, by first interacting with EPCIS Repository 220. Such interactions may take two forms. In the "on-demand" form, an EPCIS Accessing Application 204 may make a request through the EPCIS Query Control Interface 202 and receive a response based on EPC-related data immediately. In "standing request" or "asynchronous" mode, an EPCIS Accessing Application 204 may establish a subscription for a periodic query. Each time the periodic query is executed, the resulting EPC-related data may be delivered or "pushed" to the EPCIS Accessing Application asynchronously via EPCIS Query Callback Interface 202. EPCIS Query Callback Interface 202 may also be used to deliver information immediately upon capture, for example, in the form of a "real-time push."

The fact that the EPCIS Interfaces are situated at the top portion of the EPCglobal Architecture Framework has several advantages. First, each of the interfaces in the lower framework levels insulates the higher levels of the framework from being weighed down by unnecessary details of how the lower levels are implemented. As an example, Reader Protocol Interface 208 insulates the higher levels from knowing what RF protocols are in use and/or what reader models are being used. Similarly, Filtering & Collection Interface insulates the higher levels from the design specifics with regard to how tags are sensed. For example, if a particular sensing arrangement is replaced with another, the events collected at Filtering & Collection level 218 should remain the same because of this insulation effect.

At the highest level, EPCIS insulates enterprise/organization applications such as EPCIS Accessing Applications 204 from having to understand the details in a business process. As an example, regardless of how an EPCIS event specifying that a particular situation occurred in a particular pallet was determined, whether by the observation and recordation of a human operator, by filtering of triggered events sent by a reader protocol interface to the Filtering and Collection level, or by any other method, the EPCIS event that is presented, for example, an EPCIS Accessing Application 204, remains unchanged.

The EPCIS Interfaces have a number of similarities to the interfaces at the lower levels of the EPCglobal Architecture Framework. However, the EPCIS Interfaces also differ from the elements at the lower levels of the EGCglobal Architecture Framework in a number of ways.

First, EPCIS works with historical EPC-related data as well as current EPC-related data. This is different from the lower levels of the framework, which are directed to the collection and processing of real-time EPC-related data.

Second, EPCIS works with business contexts and not just raw EPC-related observations. The business contexts provide a suitable lens through which the raw EPC-related observations may be analyzed, for example, to enable intelligent inferences to be made based on the observations within certain business applications. For example, an observation provided by Filtering & Collection 218 may indicate that a particular product bearing an EPC was seen at a particular reader at a particular time. This information, while specific, has no business context. At the semantically higher level of the EPCIS, the above observation may be tied into a business context that provides the fact that the reader is located at a warehouse door, where the reader is triggered when new products arrive on a conveyor belt. Using this business context, the above observation may result in the inference that the product bearing the EPC is now stored in the warehouse and ready for shipping to retailers. In this way, the EPCIS incorporates into the event observation an understanding of the business context in which the EPC data were obtained so as to provide intelligent information that is useful in view of that business context. Because EPCIS allows storage of real-time EPC-related data, for example, in an EPCIS Repository 220, event information at the EPCIS level need not be directly tied to specific physical tag observations. For example, the EPCIS may provide inventory information that is generated based on inferences from history data stored within an EPCIS Repository 220.

Additionally, EPCIS is able to operate within a much more diverse network environment when compared to the elements at the lower levels of the EPCglobal Network Architecture Framework. EPCIS's adaptability to a multi-faceted network is particularly valuable when enterprises/organizations that have very different systems or network configurations wish to share data. In this regard, the insulation of EPCIS from the various lower levels within the framework, as discussed above, becomes particularly useful in shielding different implementations at the lower levels from accessing applications. In other words, EPCIS incorporates semantic information about business processes into raw EPC data and provides intelligent inferences based on raw and historical EPC data. In this way, EPCIS prevents and insulates applications that query and analyze information provided by EPCIS from understanding the detailed implementations and business processes within an enterprise/organization.

It should be noted that consistent with FIG. 2, EPCIS Accessing Applications 204 may reside either within the same network as the EPCIS Interfaces or within the systems of, for example, another enterprise/organization. In some embodiments, EPCIS Accessing Applications 204 residing within the systems of another enterprise/organization, such as Enterprise B (200B), may be granted access to a subset of the information that is available from an EPCIS Capturing Application 212 or within an EPCIS Repository 220. Details for granting access to a subset of the information via an enterprise/organization based access approach will be discussed in later sections.

Other elements that are complementary to the essential elements of EPCIS may also be included in the EPCglobal Architecture Framework 200. Examples of such elements may include Object Naming Service (ONS) Root 222 and Local ONS 224, which are network services that are used to look up pointers to the EPCIS provided by an enterprise/organization that is responsible for an EPC associated with a product. A search for pointers to such an EPCIS may be based on, for example, an EPC Manager Number such as one assigned by Manager Number Assignment 226 or based on the full Electronic Product Code. Typical utilizations of an ONS may include, for example, a retailer looking up an EPCIS that provides product data from a manufacturer for a product having a given EPC.

EPCIS Discovery 228 may be another complementary element to EPCglobal Architecture Framework 200. At a high level, EPCIS discovery 228 is capable of locating all EPCIS Repositories that may have data associated with a particular EPC. This discovery service is useful, for example, when an accessing application has no idea which EPCIS has EPC-related data that is relevant to a query that it wishes to perform. In one example, a retailer may wish to know the transport history of a product but has no idea which parties have participated in the transportation and storage of the product since the product left the manufacturer.

It should be noted that a single physical software or hardware component may play more than one role consistent with FIG. 2. For example, an enterprise/organization application such as a Warehouse Management System may simultaneously play the role of EPCIS Capturing Application 212, for example, to detect EPCs during product movement at loading time, and the role of EPCIS Accessing Application 204, for example, to analyze EPC-related data for making business decisions.

It should also be noted that FIG. 2 is merely an illustration of a suitable EPCglobal Architecture Framework. Appropriate additions, modifications, and deletions may be incorporated without departing from the spirit of the present invention.

It is apparent from the above description of the general EPCglobal Architecture Framework that EPCIS, which provides a more comprehensive insulation of technical implementations and business processes at the lower level, needs a complementary richer set of access techniques. For example, the incorporation of business context will require that the EPCIS be capable of handling a variety of data types and be flexible enough so that it may be expanded or extended to accommodate new and different business contexts. Also, in anticipation of widely different systems and networks that the EPCIS must adapt to across enterprises/organizations, the EPCIS must be structured carefully so as to maintain consistency and interoperability.

With these requirements in mind, the EPCIS may be implemented in accordance with a framework that is layered, extensible, and modular. With regard to being layered, the structure of data in connection with EPCIS may be defined separately from the particulars of data access services and interface protocols. This separation enables the EPCIS data to maintain consistent meaning across the enterprises/organizations over time regardless of changes that might be made to the data access services or the interface protocols. This may also enable the separately defined EPCIS data to be used in other frameworks, such as an EDI framework.

Figure 3:
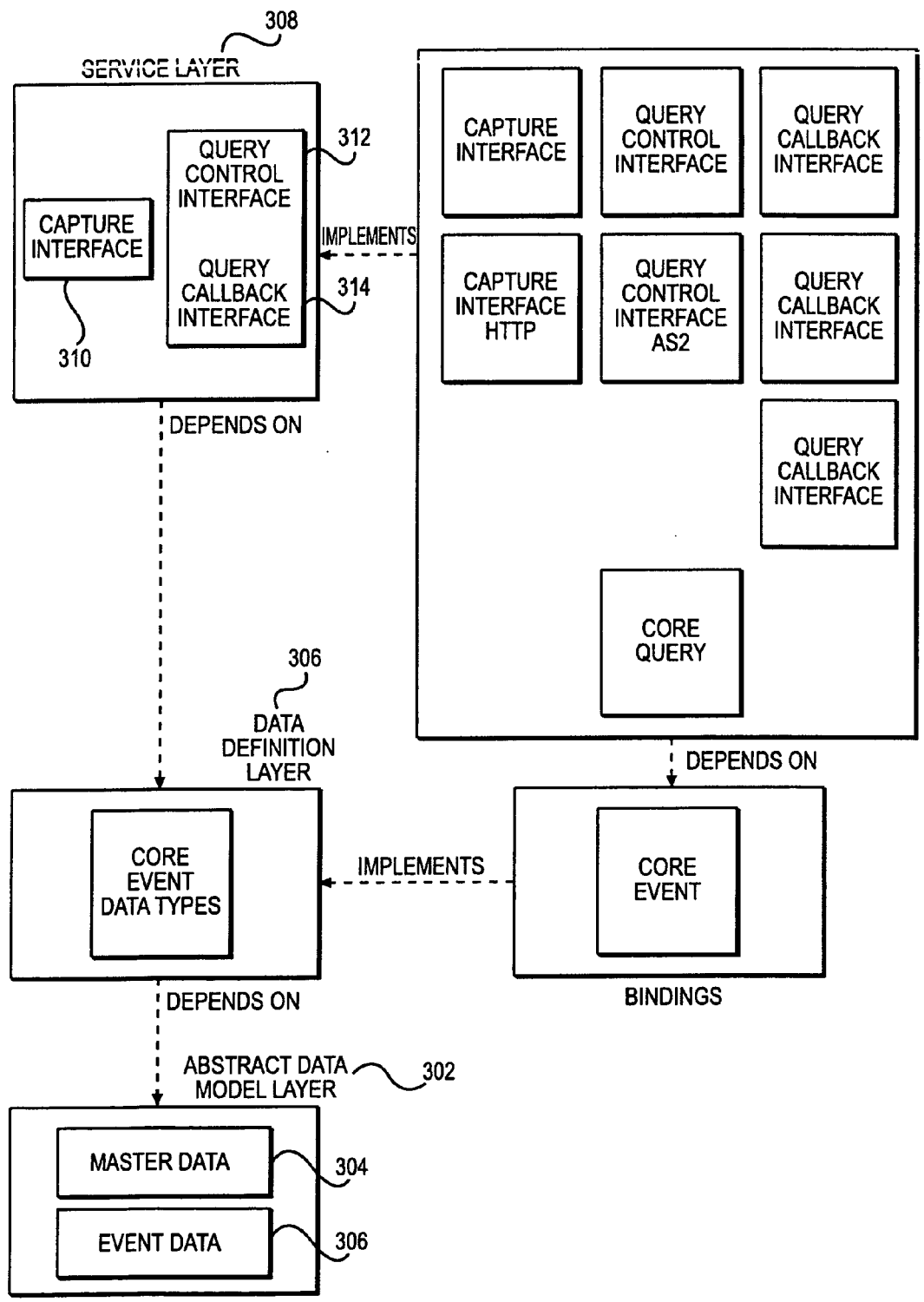
FIG. 3 shows a block diagram of suitable layers that may be implemented in connection with an EPCIS framework.

FIG. 3 shows a block diagram of suitable layers that may be implemented in connection with an EPCIS framework. At the bottom level of this framework lies Abstract Data Model Layer 302. This layer may define the generic structure of EPCIS data and may be made non-extensible without revising the EPCIS core specification. By not allowing extension to be added freely, Abstract Data Model Layer 302 maintains a consistent set of general requirements for creating data definition.

Figure 4:
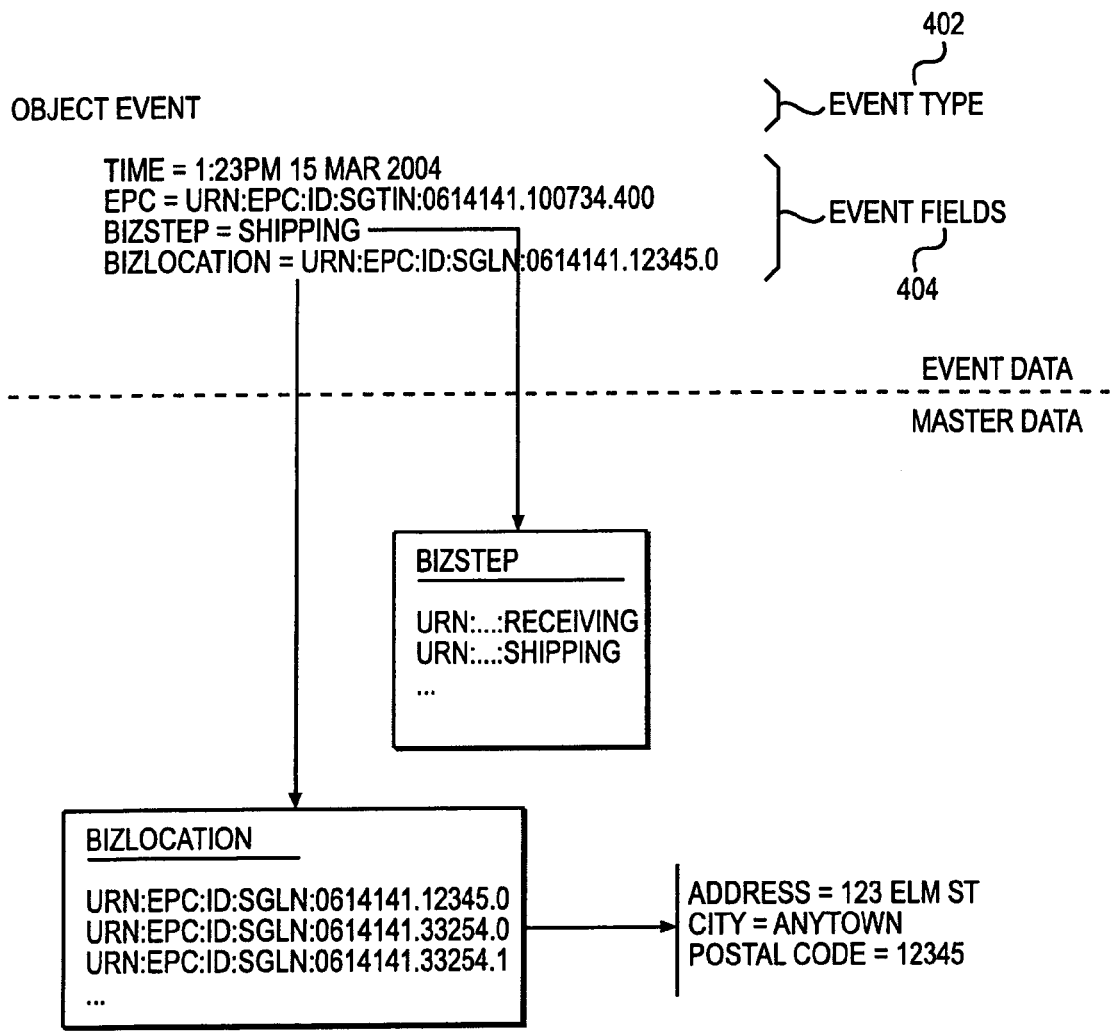
FIG. 4 shows an illustrative set of master data and event data consistent with the EPCIS framework.

Generally, Abstract Data Model Layer 302 may include two types of data: master data 304 and event data 306. Event data 306 may be any suitable data that is generated during the business processes and captured, for example, by an EPCIS Capturing Interface, such as interface 201 of FIG. 2. An example of event data may be a specific observation of an EPC at a particular time by a particular reader. Event data 306 may be made available for querying, for example, through an EPCIS Query Interface, such as interface 202 of FIG. 2. An illustrative set of event data is shown in the top portion of FIG. 4. In this example, the event data describes a specific EPC that has been observed at a specific bizLocation at a specific time during a shipping step.

Master data 304 does not deal with actual observations of events, but is additional data that defines a business context for interpreting the event data. As an example, master data 304 may include identifiers for locations, business process steps, and other business context that can provide business meaning to the raw observations contained in event data 306. An illustrative set of master data is shown in the bottom portion of FIG. 4. In this example, the master data lays out all the possible bizSteps from which the shipping step was chosen and all the possible BizLocations from which the actual BizLocation in the event data was chosen, and how those BizLocations may correspond to actual locations.

Referring back to FIG. 3, Data Definition Layer 306 may be found above Abstract Data Model Layer 302. Data Definition Layer 306 may define at a higher level what data is allowed to be exchanged through EPCIS, what type of abstract structure this data should take on, and what the data means. Data definitions made in Data Definition Layer 306 conform to the set of rules specified in Abstract Data Model Layer 302 below. As an example, event types, as illustrated by event type 402 in FIG. 4, may be defined in Data Definition Layer 306 and may specify a list of standard event fields 404 for each event type. An event type may also include other subclass event types. The event types 402 defined may be consistent with the rules associated with raw event data 306 specified in Abstract Data Model Layer 302.

Service Layer 308 may be found above Data Definition Layer 306 in FIG. 3. This layer defines the service interfaces that clients of EPCIS interact with. According to one suitable approach, the interface definitions in the service layer may be specified abstractly using UML. Some illustrative interfaces that may be defined in this layer may include, for example, EPCIS Capture Interface 310, EPCIS Query Control Interface 312, and EPCIS Callback Interface 314.

In addition to being layered, the core specifications of the EPCIS, which may include, for example, various data types and operations that are applicable across enterprises/organizations, may be made extensible to include other data types, operations, etc. that are particular to a particular enterprise/organization or industry. This ability to make additions to the core specifications strengthens the concept of a more standardized core, because it allows particularities that do not conform to the standard core to be included as extensions. The layering and extensibility mechanisms allow different parts of the EPCIS to be specified by different documents and at the same time promote coherence across the entire framework to ensuring standardization.

Figure 5:
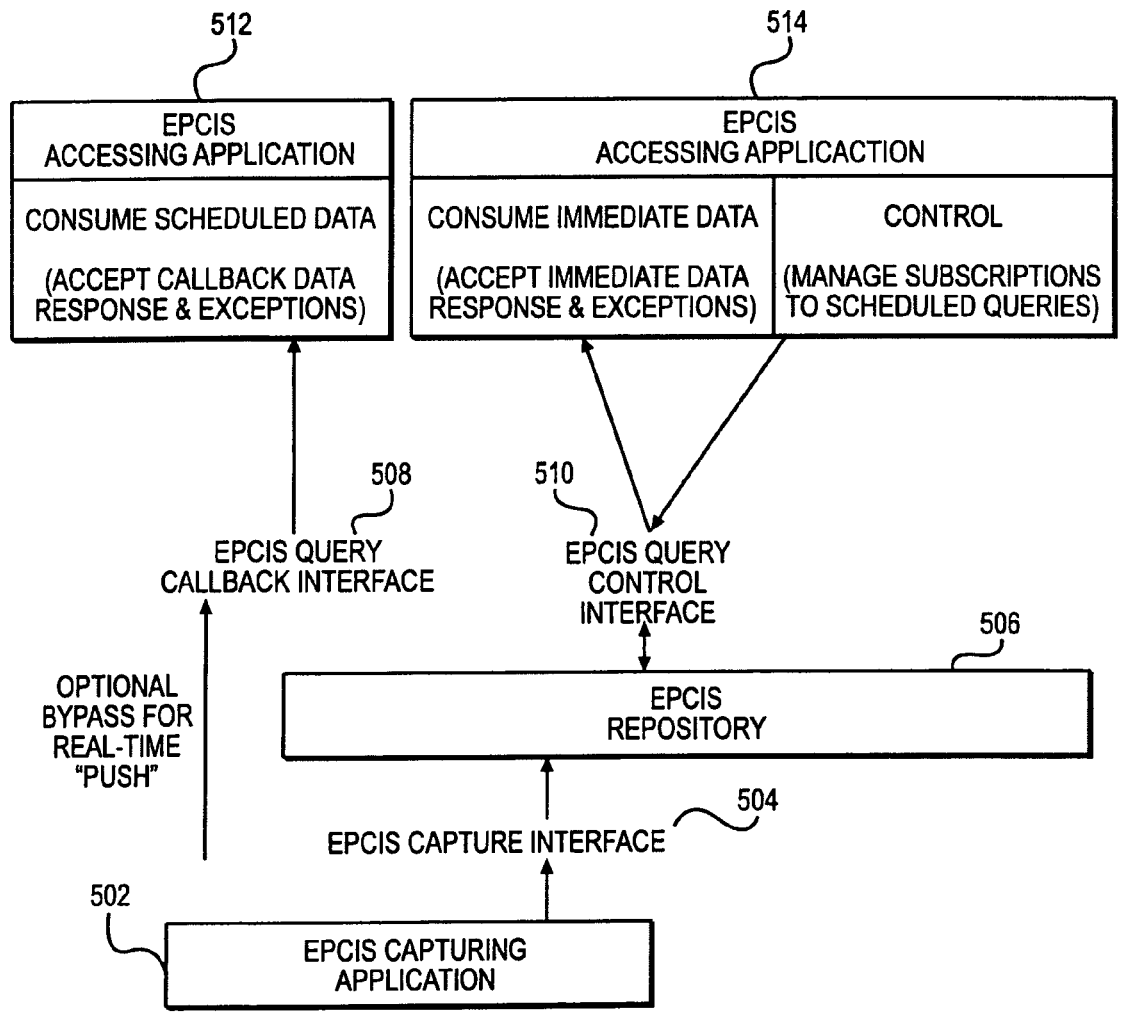
FIG. 5 is a block diagram of one suitable arrangement for allowing EPCIS interfaces to interact with each other and with EPCIS accessing applications.

On a more specific level, FIG. 5 provides a block diagram of one suitable arrangement for allowing the EPCIS interfaces to interact with each other and with EPCIS accessing applications. At the lower level, EPCIS Capture Application 502 may deliver core events to EPCIS Capture Interface 504. A capture operation may be permitted or prevented based on the success of the mutual authentication. As an example, "message bus" technology may be used by EPCIS Capture Interface 504 to interconnect different distributed system components and provide a channel for in-order delivery of messages by designating a particular message bus channel, for example, to deliver EPCIS events from an EPCIS Capture Application 502 to EPCIS Repository 506.

EPCIS Query Callback Interface 508 and EPCIS Query Control Interface 510 may enable EPCIS data to be retrieved by EPCIS Accessing Applications 512 and 514. In particular, EPCIS Query Control Interface 510 allows EPCIS Accessing Application to retrieve data on-demand and to enter subscriptions for standing queries, which may be any suitable queries that are pre-determined and run, for example, periodically or in response to certain triggering events, to return EPCIS data. Results of such standing queries may be delivered to EPCIS Accessing Application 512 via EPCIS Query Callback Interface 508. Similar to the authentication performed at the EPCIS Capture Interface level, means may be provided, for example, for a requesting EPCIS Accessing Application 512 or 514 to be authenticated through EPCIS Query Control Interface 510 or EPCIS Query Callback Interface 508. Once authenticated, EPCIS Accessing Application 514 may gain access to EPCIS data through an EPCIS interface based on the appropriate authorization associated with EPCIS Accessing Application 514.

As previously noted, an EPCIS service may wish to restrict access by another enterprise/organization to a subset of the totality of data available, for example, because the other enterprise/organization plays a particular role in relation to the enterprise/organization that owns the data (e.g., a manufacturer attempting to access retailer data). The EPCIS service may further wish to restrict data access by certain individuals and/or sub-organizations within the other enterprise/organization because of their specific roles within that organization (e.g., a manager of the manufacturer vs. a warehouse worker). In restricting access, EPCIS may, for example, refuse to perform a requested query made by an EPCIS accessing application. In some embodiments, EPCIS may perform the query, but may respond to the requesting EPCIS Accessing Application with less than the full set of data generated by the query. In some embodiments, EPCIS may respond with less detailed results than what the query could actually generate if no authorization restrictions were in place. In some embodiments, EPCIS may hide or redact some of the information in the query result before delivering it to the requesting EPCIS Accessing Application.

Figure 6:
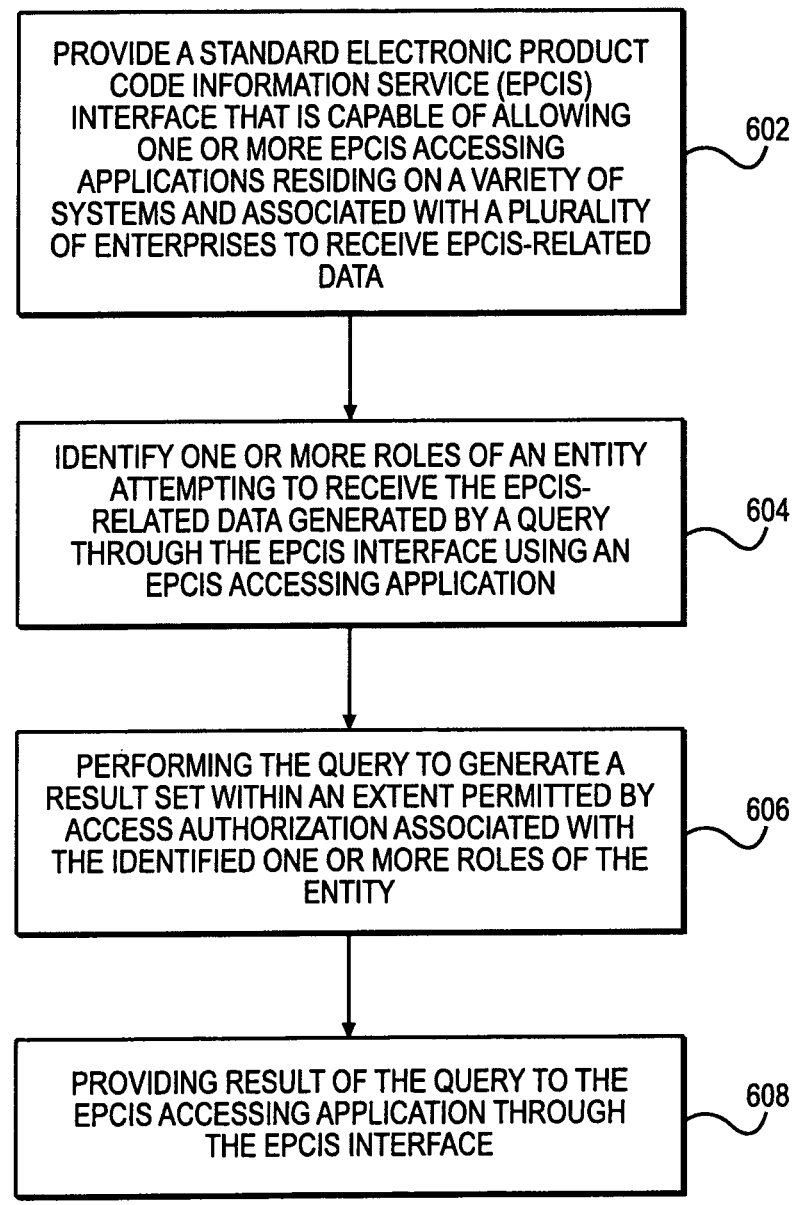
FIG. 6 shows a flowchart of suitable stages involved in providing restricted access to EPC-related data via an EPCIS interface according to a role-based access approach.

FIG. 6 shows a flowchart of illustrative stages involved in providing restricted access to EPC-related data via an EPCIS interface according to a role-based access approach. According to this approach, each entity including, for example, individuals, sub-organizations, and enterprise/organizations that attempts to receive EPC-related data, is given an appropriate level of access in accordance with its role. At stage 602, an EPCIS interface, such as interfaces 201 and 202 of FIG. 2, may be provided to allow one or more EPCIS accessing applications residing on a variety of systems and associated with a plurality of enterprises/organizations to receive EPC-related data. The EPC-related data may be owned by a plurality of enterprises/organizations and hosted on a variety of systems. The EPCIS interface may act as a bridge to connect the diverse systems both inside and outside of an enterprise/organization and may enable data exchange in a seamless fashion using standard rules that each system understands.

In many instances, an enterprise/organization may wish only to share a subset of all of its available EPC-related data with another enterprise/organization, for example, because of the other enterprise/organization's role in relation to the enterprise/organization sharing its EPC-related data. The sharing enterprise/organization may further wish to provide different levels of access authorizations to individuals and/or sub-organizations within another enterprise/organization based on their roles within that enterprise/organization. One suitable approach to address the above need may be to first determine and/or identify the appropriate roles that are associated with an enterprise/organization as well as any entity such as individuals and/or sub-organizations within the enterprise/organization that attempts to access EPC-related data prior to granting data access. The identification of such roles may be carried out at stage 604.

One suitable approach for performing role identification of an enterprise/organization may involve common role definitions that are standardized across a plurality of enterprises/ organizations that wish to share information. As an example, each enterprise/organization that wishes to participate in data sharing in accordance with a supply chain management scheme may adopt common definitions of standard roles such as, for example, manufacturer, supplier, transporter, retailer, etc. By adopting these common definitions, each enterprise/organization may properly authenticate into one or more defined roles that are recognized by all other participating enterprises/organizations.

In some embodiments, each participating enterprise/organization may assign access authorization rights in correspondence with each of the standardized roles based on its own privacy policies, thereby providing appropriate levels of data access to enterprises/organizations having different roles. For example, each retailer may specify how much information an enterprise/organization acting in the manufacturer role is able to access. In some embodiments, the participating enterprises/organizations may agree upon a standard level of access authorization for a specific role, but commonality may not be necessary. An enterprise/organization may be recognized by another based on a standardized role, and access authorization may be provided to the authenticated enterprise/organization based on that role.

In some embodiments, an enterprise/organization may authenticate into a standard role, for example, based on its profile. The enterprise/organization profile may contain information such as enterprise/organization name, enterprise/organization functions/activities with respect to, for example, associated EPCs, and any other enterprise/organization-specific data. The enterprise/organization may authenticate into a standard role, for example, based on its enterprise name when the number of participating organizations is small. When the number of participating organizations is large, the authentication into a role may be based on, for example, an enterprise/organization's functions with respect to certain groups of EPCs. For example, if an enterprise/organization performs a lot of manufacturing functions with respect to a product bearing an EPC, the enterprise/organization may be authenticated into a manufacturer role with respect to that product and be recognized as such by other enterprises/organizations sharing data associated with that product. It should be noted that any other methods of role authentication may be performed without departing from the spirit of the present invention.

It should also be noted that an enterprise/organization may authenticate into a plurality of roles, for example, with respect to different products bearing EPCs. As one example, an enterprise may produce televisions and may assume a manufacturer role with respect to other enterprises/organizations (e.g., transporters, retailers, etc.) involved in the television supply chain. To produce the televisions, the enterprise/organization may purchase components such as the television casing from other enterprises/organizations and may participate in that supply chain in a buyer role. As another example, the above enterprise/organization may transport the televisions in addition to producing them. In view of this, the enterprise/organization may authenticate into multiple roles including, for example, both manufacturer and transporter roles. Any other role assignment schemes for enterprises/organizations may be used without departing from the spirit of the present invention.

In addition to identification of roles for enterprises/organizations, stage 604 may also include role identification for an individual and/or sub-organization within an enterprise/organization. In some embodiments, individuals and/or sub-organizations may authenticate into one or more roles in accordance with a common directory for the participating enterprises/organizations. This approach may work if the number of individuals and/or sub-organizations to keep track of is relatively small, but may not be suitable if the number of individuals and/or sub-organizations is large.

For role authentication on a large scale, a two step process may be used. First, each individual and/or sub-organization may authenticate with the enterprise/organization to which it is associated. As an example, an enterprise/organization may maintain a list and/or directory of individuals and/or sub-organization that may assume certain roles within the enterprise/organization. In some embodiments, the roles within an enterprise/organization need not be specific and may generally refer to levels of data access authorization. As an example, an enterprise/organization may provide its managers with the highest level of authorization, which may enable the managers to access any data that the enterprise/organization may be authorized to access, for example, with respect to another enterprise/organization's data obtained through an EPCIS interface. The same enterprise/organization may only provide access to a subset of such information to a worker at a lower level by authenticating the worker to a role having a lower level of data access authorization.

It should be noted that even for individuals and/or sub-organization that do not belong to any actual enterprise/organization that exist outside of the EPCIS framework, such individuals and/or sub-organizations may be authenticated in association with an enterprise/organization defined for the specific purpose of authenticating such individuals and/or sub-organizations into roles. As a specific example, an enterprise/organization may be defined through which a freelance building contractor may authenticate into, for example, a buyer role, which may enable the contractor to access, for example, EPC-related data associated with building materials that the freelance contractor purchases from a supplier.

The authentication of an enterprise/organization or any individual and/or sub-organization within the enterprise/organization may take place, for example, when an EPCIS accessing application used by the enterprise/organization or any individual and/or sub-organization within the enterprise/organization attempts to obtain EPC-related data through an EPCIS interface from another enterprise/organization. The attempt to obtain EPC-related data may be made, for example, in the form of a new query, in the form of a standing query, or in any other suitable request form. When the entity using the EPCIS accessing application is authenticated into one or more roles, the EPCIS interface may perform the requested query to generate a result set that remains within an extent permitted by access authorization associated with the one or more roles at stage 606.

As an example, an enterprise/organization may authenticate into a supplier role with respect to another enterprise/organization, such as a retailer, that retails the supplier's products. Based on the supplier role, the first enterprise/organization may gain authorization to allow it to obtain EPCIS data owned by that retailer that is associated only with the supplier's own products. The requested query sent to a retailer selling the supplier's products may be to obtain information on all sales made at the retailer's location for a particular date. In view of the supplier's authorization, the query may be performed to the extent to only generate a result set that includes sales made at the retailer's location of the supplier's products for a particular date.

In some embodiments, the access authorization levels may be standard across the different enterprises/organizations, for example, based on their roles such as supplier, retailer, transporter, etc. The authorization level may be made modifiable, for example, by an enterprise/organization giving access permission to its own data to another enterprise/organization.

Any other way of providing access authorization levels to an enterprise/organization may be implemented without departing from the spirit of the present invention.

As mentioned above, individuals and/or sub-organizations within a particular enterprise organization may only have authority to access a subset of the data that the enterprise/organization, in its appropriate role, is able to access. Accordingly, the result set generated based on the query that is accessible to the enterprise/organization may be further restricted to provide an appropriate result set that is suitable for access by an individual and/or sub-organization within the enterprise/organization. This result set may be provided to the entity using the EPCIS accessing application at stage 608.

In some embodiments, the reduced result set may be generated by, for example, redacting EPCIS data that is not authorized for access by an entity, by making the query result more high level and less detailed than the result that would have been presented if no authorization restrictions were in place, by removing a part of the unrestricted result, or by any other suitable restriction methods. It will be noted that the stages of FIG. 6 are merely provided as illustrates of the stages that may be involved in providing restricted access to enterprises/organizations and its associated individuals and/or sub-organizations. Stages may be added, removed, or otherwise modified without departing from the principles of the present invention.

A computer system may be used to install a software application implementing a system and method for providing EPCIS interfaces capable of allowing one or more EPCIS accessing applications residing on a variety of systems and associated with a plurality of enterprises/organizations to receive EPC-related data. The computer system may be a computer network, as shown in FIG. 7, or a stand-alone personal computer (PC), as shown in FIG. 8.

Figure 7:
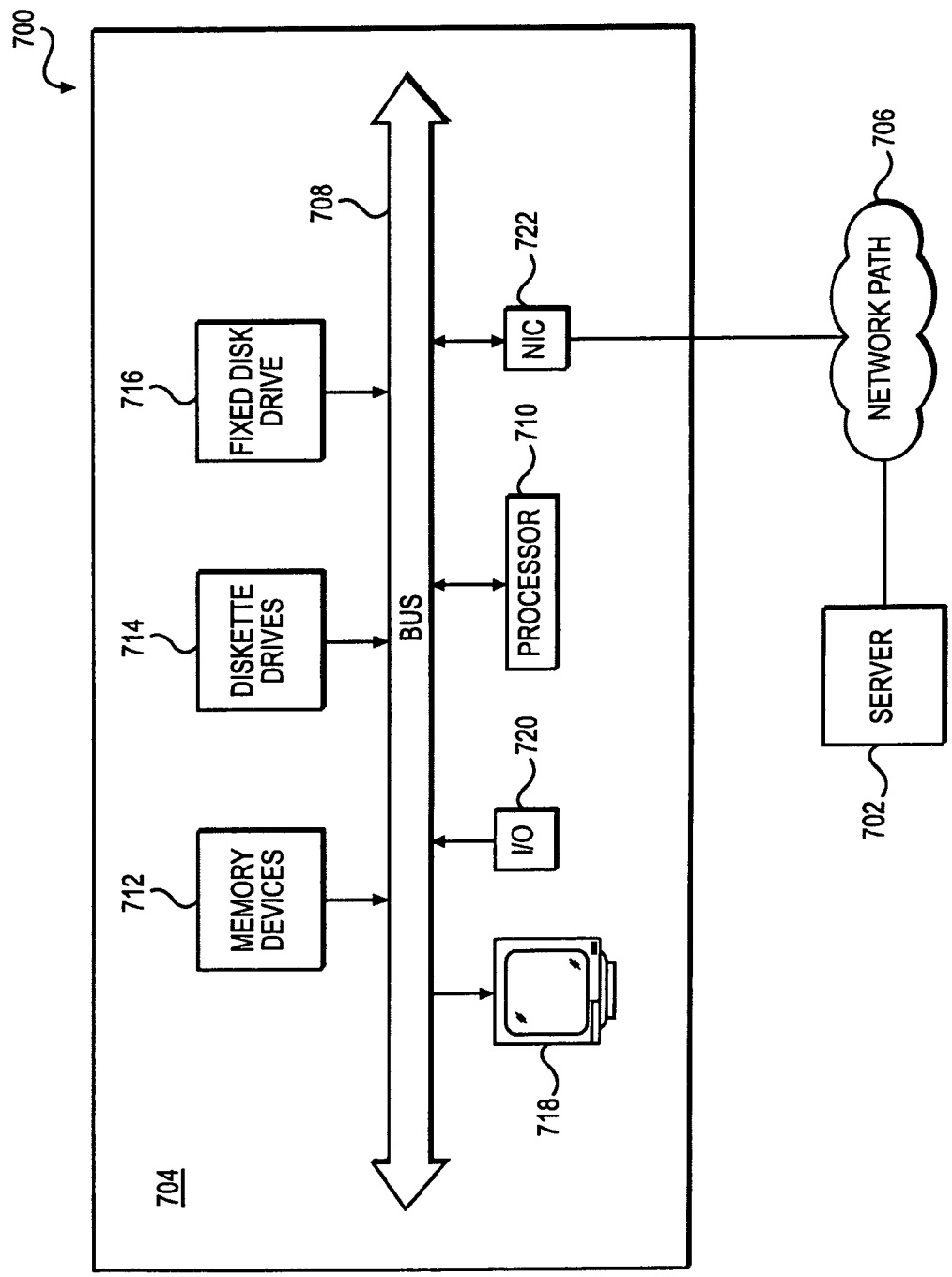
FIG. 7 shows a computer system capable of implementing elements of the EPCIS framework.
Figure 8:
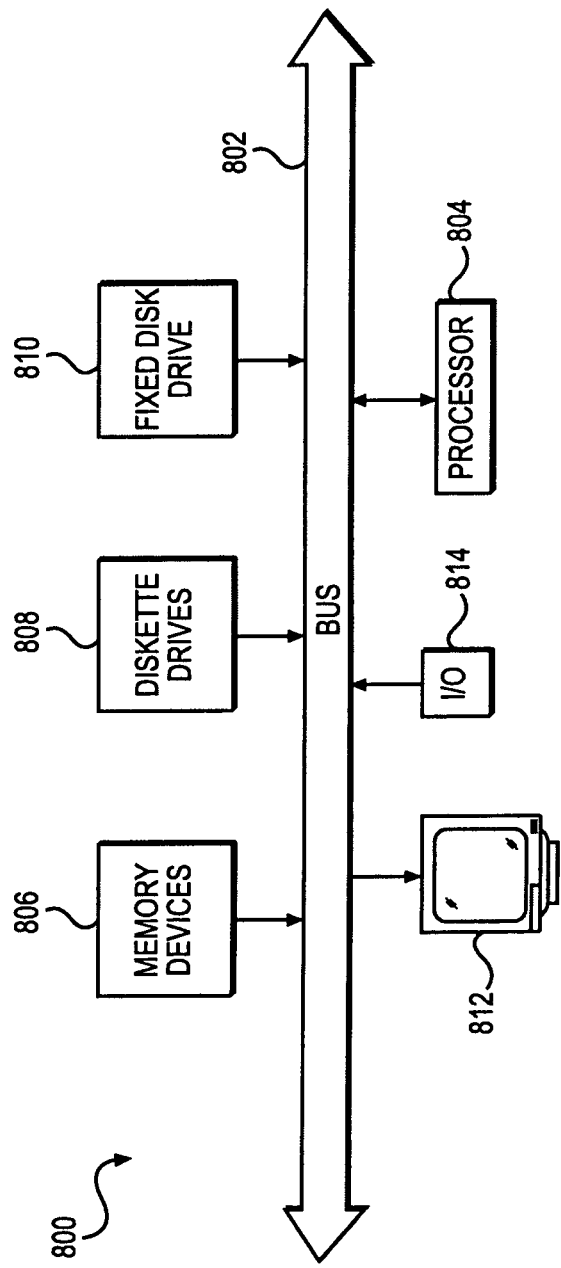
FIG. 8 shows another computer system capable of implementing elements of the EPCIS framework.

As shown in FIG. 7, a computer network 700 in accordance with systems consistent with the principles of the present invention may include a server 702 and a stand-alone PC 704 connected through a network path 706. Computer network 700 may be a local area network (LAN), where server 702 and PC 704 are workstations. Computer network 700 may also be the Internet, with server 702 hosting a web application and PC 704 being any workstation available to a user desiring to interface with the application on server 702. Alternatively, computer network 700 may be a wide area network (WAN), and server 702 and PC 704 may lie in two separate LANs connected through the Internet.

PC 704 may include a bus line 708 connecting a plurality of devices such as a processor 710, memory devices 712 for storage of information, diskette drives 714, a fixed disk drive 716, a monitor or display 718, other I/O devices 720, and a network interface card (NIC) 722. Processor 710 may be a microprocessor such as an Intel Pentium™ chip for processing applications. Memory devices 712 may include read-only memories (ROM) and/or random access memories (RAM). Diskette drives 714 may include a floppy drive and/or a compact disk (CD) drive. Fixed disk drive 716 may be a hard drive. I/O devices 720 may include a keyboard and/or a mouse for receiving input from a user of PC 704. Monitor or display 718 may display output from processor 710, and may also echo the input of the user. PC 704 may be connected to network path 706 through NIC 722.

A web application may be installed on server 702. An individual desiring to enter data into the application on server 702 may use a web browser loaded on PC 704, and may communicate with server 702 through NIC 722 and network path 706. In one aspect, software application for implementing a system consistent with the principles of the present invention may be stored in PC 704 and processor 710 of PC 704 may execute the software application locally within PC 704 and interface with a web application on server 702. Particularly, the software application may be stored on a floppy disk, a CD, or any other suitable readable media, which may be accessible by diskette drive 714, fixed disk drive 716, or any other suitable mechanism. In another aspect, the software application for implementing a system consistent with the principles of the present invention may be stored in server 702, which may execute the software application, and processor 710 of PC 704 may communicate with server 702 to send information to server 702 and retrieve the results of the execution of the software application from server 702.

Through the execution of the software application implementing a system consistent with the principles of the present invention, either locally within PC 704 or remotely within server 702, an interface or screen may be provided on a user display.

Alternatively, as shown in FIG. 8, a stand-alone PC 800 may be used for implementing a software application implementing a system consistent with the principles of the present invention. PC 800 may include a bus line 802 connecting a plurality of devices, which may include a processor 804, memory devices 806 for storage of information, diskette drives 808, a fixed disk drive 810, a monitor or display 812, and other I/O devices 814. Processor 804 may be a microprocessor such as an Intel Pentium™ chip for processing applications. Memory devices 806 may include ROM and/or RAM. Diskette drives 808 may include a floppy drive and/or a compact disk (CD) drive. Fixed disk drive 810 may be a hard drive. Monitor or display 812 may display the output of processor 804 and may also echo the input of the user. I/O devices 814 may include a keyboard and/or a mouse for receiving input from a user of PC 800.

A software application implementing a system consistent with the principles of the present invention may be stored on a floppy disk or a CD accessible by diskette drive 808 or on fixed disk drive 810. Processor 804 may execute the software application stored in the floppy disk the CD or the fixed disk drive 810. An individual, through monitor or display 812 and I/O devices 814, may interact with processor 804, which may execute the software application. A software application implementing a system consistent with the principles of the present invention may be written in any number of programming languages, including but not limited to JavaScript, Visual Basic, Flash, ABAP coding, or any other suitable language. Similarly, the present invention is not limited to use with certain applications, Internet browsers or operating systems.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

While the present invention has been described in connection with various embodiments, many modifications will be readily apparent to those skilled in the art. One skilled in the art will also appreciate that all or part of the systems and methods consistent with the present invention may be stored on or read from computer-readable media, such as secondary storage devices, like hard disks, floppy disks, and CD-ROM;

a carrier wave received from a network such as the Internet; or other forms of ROM or RAM. Accordingly, embodiments of the invention are not limited to the above described embodiments and examples, but instead is defined by the appended claims in light of their full scope of equivalents.

What is claimed is:

1. A method for providing role-based data access to sensor-related data, comprising:

providing an interface allowing one or more accessing applications residing on a variety of systems and associated with a plurality of enterprises/organizations to receive sensor-related data;

receiving a query for sensor-related data from an accessing application associated with an entity, wherein the entity is one of an enterprise/organization, an individual associated with an enterprise/organization, and a sub-organization associated with an enterprise/organization;

identifying at least one function of the entity with respect to one or more groups of products bearing Electronic Product Codes;

identifying one or more roles associated with the entity based on the at least one identified function of the entity, wherein the one or more roles associated with the entity are defined in relation to other entities from whom the entity is to receive sensor-related data;

performing the query to generate a result set within an extent permitted by access authorization associated with the identified one or more roles of the entity; and providing the result set to the accessing application through the interface.

2. The method of claim 1, wherein the result set provided to the accessing application through the interface is redacted based on the access authorization associated with the identified one or more roles.

3. The method of claim 1, wherein a portion of the result set provided to the accessing application through the interface is removed based on the access authorization associated with the identified one or more roles.

4. A system for providing role-based data access to sensor-related data, comprising:

a memory; and a processor configured to:

provide an interface allowing one or more accessing applications residing on a variety of systems and associated with a plurality of enterprises/organizations to receive sensor-related data;

receive a query for sensor-related data from an accessing application associated with an entity, wherein the entity is one of an enterprise/organization, an individual associated with an enterprise/organization, and a sub-organization associated with an enterprise/organization;

identify at least one function of the entity with respect to one or more groups of products bearing Electronic Product Codes;

identify one or more roles associated with the entity based on the at least one identified function of the entity, wherein the one or more roles associated with the entity are defined in relation to other entities from whom the entity is to receive sensor-related data;

perform the query to generate a result set within an extent permitted by access authorization associated with the identified one or more roles of the entity; and provide the result set to the accessing application through the interface.

5. The system of claim 4, wherein the result set provided to the accessing application through the interface is redacted based on the access authorization associated with the identified one or more roles.

6. The system of claim 4, wherein a portion of the result set provided to the accessing application through the interface is removed based on the access authorization associated with the identified one or more roles.

7. A non-transitory computer-readable medium including instructions for performing, when executed by a processor, a method for providing role-based data access to sensor-related data, the method comprising:

providing an interface allowing one or more accessing applications residing on a variety of systems and associated with a plurality of enterprises/organizations to receive sensor-related data;

receiving a query for sensor-related data from an accessing application associated with an entity, wherein the entity is one of an enterprise/organization, an individual associated with an enterprise/organization, and a sub-organization associated with an enterprise/organization;

identifying at least one function of the entity with respect to one or more groups of products bearing Electronic Product Codes;

identifying one or more roles associated with the entity based on the at least one identified function of the entity, wherein the one or more roles associated with the entity are defined in relation to other entities from whom the entity is to receive sensor-related data;

performing the query to generate a result set within an extent permitted by access authorization associated with the identified one or more roles of the entity; and providing the result set to the accessing application through the EPCIS interface.

8. The non-transitory computer-readable medium of claim 7, wherein the result set provided to the accessing application through the interface is redacted based on the access authorization associated with the identified one or more roles.

9. The non-transitory computer-readable medium of claim 7, wherein a portion of the result set provided to the accessing application through the interface is removed based on the access authorization associated with the identified one or more roles.

* * * * *